(12) United States Patent
Takaishi et al.

(10) Patent No.: US 7,820,578 B2
(45) Date of Patent: Oct. 26, 2010

(54) DIELECTRIC CERAMIC COMPOSITION AND METHOD OF PRODUCTION THEREOF

(75) Inventors: Tetsuo Takaishi, Tokyo (JP); Tomoaki Nonaka, Tokyo (JP); Hiroshi Sasaki, Tokyo (JP); Tsutomu Odashima, Tokyo (JP); Kenta Iwasawa, Tokyo (JP)

(73) Assignee: TDK Corporation, Tokyo (JP)

( * ) Notice: Subject to any disclaimer, the term of this patent is extended or adjusted under 35 U.S.C. 154(b) by 104 days.

(21) Appl. No.: 12/289,962

(22) Filed: Nov. 7, 2008

(65) Prior Publication Data

US 2009/0137381 A1 May 28, 2009

(30) Foreign Application Priority Data

Nov. 26, 2007 (JP) ............................. 2007-304577

(51) Int. Cl.
*C04B 35/465* (2006.01)
*C04B 35/47* (2006.01)

(52) U.S. Cl. ..................................... 501/136
(58) Field of Classification Search ................. 501/136
See application file for complete search history.

(56) References Cited

U.S. PATENT DOCUMENTS

| 6,118,648 | A  | * | 9/2000  | Kojima et al. | ................ | 361/311 |
| 6,617,273 | B2 | * | 9/2003  | Motoki et al. | ................ | 501/136 |
| 7,312,172 | B2 | * | 12/2007 | Sasaki et al. | ................ | 501/136 |

| 2006/0234853 | A1 | 10/2006 | Sasaki et al. |
| 2007/0127140 | A1 | 6/2007  | Reichel et al. |

FOREIGN PATENT DOCUMENTS

| JP | A-63-289707   |   | 11/1988 |
| JP | A-10-231169   |   | 9/1998  |
| JP | A-2003-212650 |   | 7/2003  |
| JP | A-2004-182534 |   | 7/2004  |
| JP | 2004217509    | * | 8/2004  |
| JP | A-2005-179105 |   | 7/2005  |
| JP | A-2007-67152  |   | 3/2007  |

* cited by examiner

*Primary Examiner*—Karl E Group
(74) *Attorney, Agent, or Firm*—Oliff & Berridge, PLC

(57) ABSTRACT

The object of the present invention is to provide a method of production of dielectric ceramic composition which can lower the firing temperature without compensating the dielectric characteristics. The method of production according to the present invention is characterized by comprising steps of;

preparing a dielectric oxide expressed by composition formula of $[(Ca_xSr_{1-x})O]_m[(Ti_yZr_{1-y-z}Hf_z)O_2]$ (x, y, z, and m in the formula are; $0.5 \leq x \leq 1.0$, $0.01 \leq y \leq 0.10$, $0 < z \leq 0.20$ and $0.90 \leq m \leq 1.04$ respectively), mixing, with respect to 100 parts by weight of the dielectric ceramic composition, 1 to 10 parts by weight of a sintering aid and 0.1 to 1.5 parts by weight of sodium oxide, sodium carbonate or a mixture thereof in terms of $Na_2O$, and firing an obtained mixture; wherein said sintering aid comprises, with respect to 100 wt % of said sintering aid, 30 to 69 wt % of manganese compound in terms of MnO, 1 to 20 wt % of aluminum oxide in terms of $Al_2O_3$, and 30 to 50 wt % of silicon oxide in terms of $SiO_2$.

1 Claim, 1 Drawing Sheet

DIELECTRIC CERAMIC COMPOSITION AND METHOD OF PRODUCTION THEREOF

BACKGROUND OF THE INVENTION

1. Field of the Invention

The present invention relates to a method of production of a dielectric ceramic composition used, for example, as a dielectric layer of a multilayer ceramic capacitor.

2. Description of the Related Art

The dielectric ceramic composition constituting the dielectric layer of the multilayer capacitor as an example of an electronic component is constituted by including various dielectric oxides such as $BaTiO_3$ which is a ferroelectric, or $SrTiO_3$, $CaTiO_3$, $CaSrZrO_3$, $CaZrO_3$, $SrZrO_3$, $TiO_2$, $NdTiO_3$ which are paraelectrics.

The dielectric ceramic composition was normally added with, besides the above dielectric oxides as a main component, a sintering aid to facilitate sintering characteristics, and then fired at high temperature such as 1300° C. or higher.

However, following problems occurs when the firing temperature is high.

First, the temperature becomes higher than the melting point of a base metal such as Ni as a material of an internal electrode, or it may become a temperature range near that. As a result, a melting and a spheroidizing of the base metal particle which is fired together with the dielectric ceramic composition are promoted, and a line characteristic of the internal electrode layer is deteriorated. That is, it may be a factor to cause problem such as the break produced in the internal electrode layer. If the line characteristic of the internal electrode layer deteriorates, the specific permittivity of the obtained capacitor declines, resulting in the decline of a capacitance, and ultimately it cannot manage to obtain a larger capacity and to make the layer thinner.

Second, a firing furnace itself is expensive, and in addition to this, because the deterioration of the used firing furnace becomes prominent, the maintenance and the management cost of the firing furnace increases as the time of use, and along with that the energy cost used for the firing becomes extremely expensive.

Also, because the firing is performed at a high temperature, the particle diameter is difficult to be controlled which easily cause a particle growth of the dielectric oxide particles. As a result, the number of the dielectric particle in the thickness direction of the dielectric layer becomes fewer, and the reliability of the electronic component declines. Furthermore, due to the difference of a thermal expansion coefficient between the dielectric layer and the electrode layer, in some cases the dielectric layers cracked during the firing or the cooling.

Due to such reasons, the firing temperature is preferably made as low as possible.

On the other hand, if the firing temperature is made too low, the dielectric layer cannot be densified, thus the dielectric ceramic composition having sufficient characteristics cannot be obtained. Therefore, it is demanded to fire at even lower temperature without deteriorating the densification of the dielectric ceramic composition.

Patent document 1 discloses a method of production of the dielectric ceramic composition, aiming to produce dielectric ceramic composition under low temperature firing, said method is to produce the dielectric ceramic composition comprising;
a dielectric oxide expressed by a composition formula of $[(Ca_xSr_{1-x})O]_m[(Ti_yZr_{1-y-z}Hf_z)O_2]$ (x, y, z, and m in the formula of are; $0.5 \leq x \leq 1.0$, $0.01 \leq y \leq 0.10$, $0 < z \leq 0.20$ and $0.90 \leq m \leq 1.04$ respectively),
manganese oxide,
aluminum oxide, and
a sintering aid; wherein
said method of production of dielectric ceramic composition uses the sintering aid comprising;
a first glass composition having $SiO_2$ as a main component, and further including MO (note that, M is at least one selected from Ba, Ca, Sr and Mg), and
a second glass composition constituted by including $B_2O_3$, $Al_2O_3$, ZnO and $SiO_2$, having an average particle diameter of 1.5 μm or less.
[Patent document 1] Japanese Unexamined Patent 2005-179105

SUMMARY OF THE INVENTION

However, it was found that when the glass composition is used as the sintering aid, as described in the patent document 1, a part of the component from the glass enters into the dielectric ceramic composition resulting in deterioration of the dielectric characteristic. Therefore, the object of the present invention is to provide the method of production of the dielectric ceramic composition in which the firing temperature can be lowered without deteriorating the dielectric characteristics.

The present invention includes the following points to solve above described object.

(1) a method of production of a dielectric ceramic composition comprising steps of;
preparing a dielectric oxide expressed by composition formula of $[(Ca_xSr_{1-x})O]_m[(Ti_yZr_{1-y-z}Hf_z)O_2]$ (x, y, z, and m in the formula are; $0.5 \leq x \leq 1.0$, $0.01 \leq y \leq 0.10$, $0 < z \leq 0.20$ and $0.90 \leq m \leq 1.04$ respectively),
mixing 1 to 10 parts by weight of a sintering aid with respect to 100 parts by weight of said dielectric oxides, and
firing an obtained mixture; wherein
said sintering aid comprises, with respect to 100 wt % of said sintering aid,
30 to 69 wt % of manganese oxide, manganese carbonate or mixture thereof in terms of MnO,
1 to 20 wt % of aluminum oxide in terms of $Al_2O_3$, and
30 to 50 wt % of silicon oxide in terms of $SiO_2$.

(2) a method of production of a dielectric ceramic composition comprising steps of;
preparing a dielectric oxide expressed by composition formula of $[(Ca_xSr_{1-x})O]_m[(Ti_yZr_{1-y-z}Hf_z)O_2]$ (x, y, z and m in the formula are; $0.5 \leq x \leq 1.0$, $0.01 \leq y \leq 0.10$, $0 < z \leq 0.20$ and $0.90 \leq m \leq 1.04$ respectively),
mixing, with respect to 100 parts by weight of the dielectric ceramic composition, 1 to 10 parts by weight of a sintering aid and 0.1 to 0.5 parts by weight of sodium oxide, sodium carbonate or a mixture thereof in terms of $Na_2O$, and
firing an obtained mixture; wherein
said sintering aid comprises, with respect to 100 wt % of said sintering aid, 30 to 69 wt % of manganese oxide, manganese carbonate or mixture in terms of MnO, 1 to 20 wt % of aluminum oxide in terms of $Al_2O_3$, and 30 to 50 wt % of silicon oxide in terms of $SiO_2$.

The present invention provides the method of production of the dielectric ceramic composition which can lower the firing temperature without deteriorating the dielectric characteristics. By lowering the firing temperature, the particle growth of the dielectric oxide particle is suppressed. As a result, the number of the dielectric particle increases in the thickness direction of the dielectric layer which densifies the dielectric layer and allows improving the reliability of the electronic component. Also, the present invention prevents the crack in the dielectric layer. Such method of production of the present invention is particularly preferably used for the production of the dielectric layer forming a capacitor satisfying the COG characteristics defined in a JIS standard CH.

DESCRIPTION OF THE PREFERRED EMBODIMENTS

Figure 1:
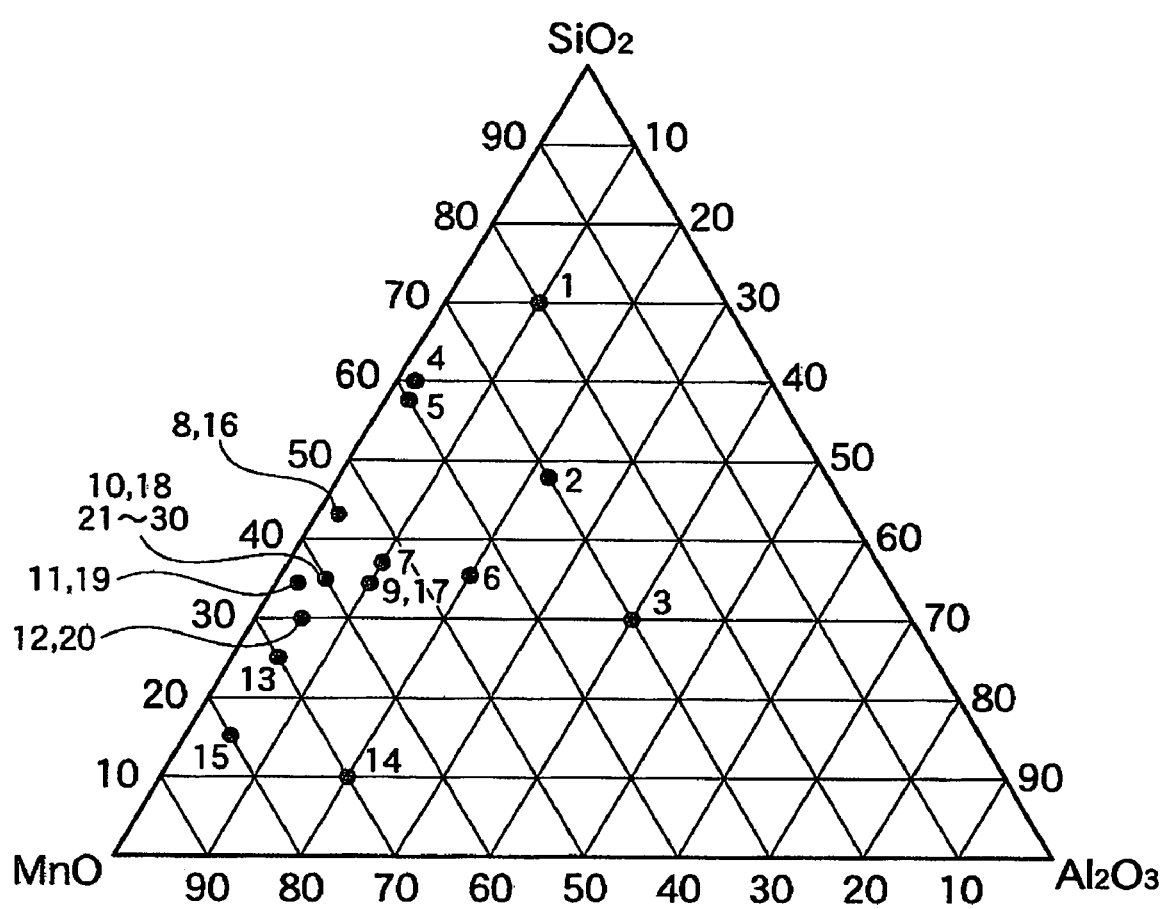
FIG. 1 is a triangular composition diagram showing the composition of the sintering aid used in the example.

Followings will explain the present invention further specifically including the preferred embodiments.

A method of production of a dielectric ceramic composition of the present invention is characterized by preparing a dielectric oxide comprising specific composition, and mixing 1 to 10 parts by weight of a sintering aid having specific composition with respect to 100 parts by weight of said dielectric oxide, followed by firing an obtained mixture.

The dielectric oxide used in the present invention is expressed by composition formula of $[(Ca_xSr_{1-x})O]_m[(Ti_yZr_{1-y-z}Hf_z)O_2]$.

In the formula;
"x" is $0.5 \leq x \leq 1.0$, preferably $0.6 \leq x \leq 0.9$,
"y" is $0.01 \leq y \leq 0.10$, preferably $0.02 \leq y \leq 0.07$,
"z" is $0 < z \leq 0.20$, preferably $0 < z \leq 0.10$, and
"m" is $0.90 \leq m \leq 1.04$, preferably $1.005 \leq m \leq 1.035$.

If the composition of the dielectric oxide exceeds the above range, the electric characteristic of the obtained dielectric ceramic composition declines. Or, the firing temperature to achieve the predetermined electric characteristic becomes high, and it may cause problems such as numerous cracks.

The method of the production of the dielectric oxide is not particularly limited, and it can be made by known methods such as a solid phase method or a liquid phase method. For example, when making the dielectric oxide by solid phase method, the starting materials of the dielectric oxide (for example, $SrCO_3$, $CaCO_3$, $TiO_2$, $ZrO_2$, $HfO_2$ or so) are scaled in predetermined amount to satisfy the above composition formula, and mixed and dried to prepare the mixture powder.

Next, the prepared mixture powder is fired (also referred as "calcine"). The condition of calcine is not particularly limited, however the firing temperature is preferably 1300° C. or less, and further preferably 900° C. to 1200° C. The holding time is 0.5 to 6 hours, and further preferably 1 to 3 hours. The temperature rising speed at the firing is preferably 50 to 400° C./hour, and further preferably 100 to 300° C./hour. The firing atmosphere may be in air, in nitrogen or in reduced atmosphere. Also, the calcine can be performed for several times.

Next, if needed, the calcined powder is coarsely grinded by alumina roll, and then dried to obtain the dielectric oxide (powder). The dielectric oxide having average particle diameter of 0.0005 to 5 μm or so is preferably used.

Then, with respect to 100 parts by weight of dielectric oxide, 1 to 10 parts by weight, preferably 1 to 6 parts by weight, and more preferably 2 to 5 parts by weight of the sintering aid having specific composition is mixed to prepare the mixture which becomes a firing material.

If the composition ratio of the sintering aid is too little, the firing temperature for obtaining the dielectric ceramic composition having predetermined electric characteristic becomes high, and numerous cracks are made. Also, if the composition ratio of the sintering aid is too much, the sintering aid is segregated in the dielectric, and causing the crack to be produced therefrom.

The sintering aid used in the present invention is mixture of manganese compound, aluminum oxide and silicon oxide.

The manganese compound is manganese oxide (MnO, $MnO_2$, $Mn_3O_4$) or manganese carbonate ($MnCO_3$), and it may be the mixture thereof. 30 to 69 wt %, preferably 45 to 63 wt % of manganese compound calculated in the conversion of MnO is used with respect to whole amount of sintering aid (100 wt %).

Furthermore, with respect to whole amount of sintering aid (100 wt %), 1 to 20 wt %, preferably 2 to 15 wt % of aluminum oxide calculated in the conversion of $Al_2O_3$, and 30 to 50 wt % preferably 35 to 40 wt % of silicon oxide calculated in terms of $SiO_2$ are used.

Although significant fall is not observed in the electric characteristic of the obtained dielectric ceramic composition, even when the composition of the sintering aid is out of above range, the firing temperature to achieve the predetermined electric characteristic becomes high which may cause problems such as numerous occurrences of cracks.

The further preferable range of the composition ratio of manganese compound, aluminum oxide and silicon oxide of the present invention, and the composition of the example is shown in the triangular composition diagram (FIG. 1).

As shown in FIG. 1, the sintering aid used in the present invention has the composition of manganese compound, aluminum oxide and silicon oxide in terms of MnO, $Al_2O_3$, $SiO_2$ (MnO, $Al_2O_3$, $SiO_2$) respectively of preferably within the area surrounded by the four points of (30, 22, 48), (30, 40, 30), (40, 2, 58) and (70, 5, 25); and particularly preferably within the area surrounded by four points of (55, 2, 43), (55, 10, 35), (62, 3, 35) and (65, 5, 30).

Moreover, in addition to the above sintering aid, sodium compound may be mixed as well. Sodium compound may be sodium oxide, sodium carbonate or the mixture thereof. When mixing sodium compound, 0.5 parts by weight or less, preferably 0.1 to 0.5 parts by weight in terms of $Na_2O$ is used with respect to 100 parts by weight of said dielectric oxide. By using above sintering aid with sodium compound, the liquefying temperature of the sintering aid is lowered, thus the firing temperature is lowered.

The sintering aid and sodium compound, which is added if necessary, forms the liquid phase during the firing. Therefore, the particle diameter of the powder material is not particularly limited, however the powder material having average particle diameter of 0.01 to 1.0 μm or so is preferably used to make the mixture with the dielectric oxide uniformly.

The method of mixing the powder material consisting of the dielectric oxide, the sintering aid, and sodium compound used if needed is not particularly limited, and it may be wet method or dry method. Also, an organic vehicle or water may be added when mixing to make the dielectric ceramic composition material into a paste, and a dielectric layer paste may be prepared. The dielectric layer paste may be an organic-based paste kneading the dielectric ceramic composition material and the organic vehicle, or it may be water-based paste.

The organic vehicle is obtained by dissolving a binder in an organic solvent. The binder used in the organic vehicle is not particularly limited, and may be properly selected from a variety of usual binders such as ethylcellulose and polyvinyl butyral. Also, the organic solvent used is not particularly limited, and may be properly selected from a variety of organic solvents such as terpineol, butyl carbitol, acetone and toluene in accordance with a method used such as a printing method and sheet method.

Also, when using water-based dielectric layer paste, dielectric materials can be kneaded with a water-based vehicle obtained by dissolving an aqueous binder and dispersant, etc., in water. The aqueous binder used for water-based vehicle is not particularly limited, and for example, polyvinyl alcohol, cellulose, aqueous acrylic resin, etc., may be used.

The dielectric ceramic composition is obtained by the steps of the binder removal, the firing, and the annealing or so; after making the mixture consisting of the above dielectric oxide, the sintering aid and the sodium compound used if needed, and preferably after making the dielectric layer paste into a sheet by appropriate means to make a green chip.

When using the printing method, the dielectric layer paste and the internal electrode paste are stacked and printed on the substrate such as polyethylene telephthalate or so, and after cutting into predetermined shape, the green chip is obtained by removing from the substrate. When using the sheet method, the green sheet is formed by using the dielectric layer paste, and after printing the internal electrode layer paste thereon, the green chip is obtained by stacking these. As for the internal electrode layer paste, various known pastes are used without particular limitation, and for example the paste comprising Ni or Ni alloy as a conducting material is preferably used.

Next, the binder removal treatment is performed to the green chip before firing. The binder removal treatment can be preformed at usual condition, however when using base metal such as Ni or Ni alloy or so as the conducting material of the internal electrode, it is preferably performed under the condition of; the temperature rising speed: 5 to 300° C./hour, particularly 10 to 100° C./hour, the holding temperature: 180 to 400° C., particularly 200 to 300° C., the temperature holding time: 0.5 to 24 hours, particularly 5 to 20 hours, the atmosphere: air.

The atmosphere during the firing of the green chip can be determined accordingly depending on the type of the conducting material in the internal electrode layer paste, however when using base metal such as Ni or Ni alloy as the conducting material, the oxygen partial pressure of the atmosphere at the firing is preferably $10^{-7}$ to $10^{-3}$ Pa. If the oxygen partial pressure is below the above range, an abnormal sintering takes place in the conducting material of the internal electrode layer, and causes breaks. Also, if the oxygen partial pressure exceeds the above range, the internal electrode layer tends to oxidize.

The holding temperature at the firing is determined accordingly in the range so that the green chip is densified sufficiently. Furthermore it is determined in the range so that the breaks of the electrode due to the abnormal sintering of the internal electrode layer, the deterioration of the capacity-temperature characteristic due to the dispersion of the material constituting the internal electrode layer, or the reduction of the dielectric ceramic composition doesn't occur. If the firing temperature is too low, the green chip is not densified, and if the firing temperature is too high, the breaks of the internal electrode layer (the deterioration of the line characteristic), the deterioration of the capacity-temperature characteristic due to the dispersion of the conducting material, and the reduction of the dielectrics take place.

Therefore, although the firing temperature is not limited, the present invention has an advantage that it can be fired at the low temperature. Therefore, the firing temperature of the present invention is preferably 1250° C. or less, and more preferably 1230° C. or less. Due to this, the damage to the firing furnace can be prevented, and the maintenance and managing cost, plus energy cost can be reduced effectively. Furthermore, problems such as the generation of cracks and the decline of the specific permittivity can be prevented. Note that, the lower limit of the firing temperature is preferably 950° C. or so, and more preferably 1000° C. or so.

As for the firing condition other than these, the temperature rising speed is preferably 50 to 500° C./hour and more preferably 200 to 300° C./hour, the temperature holding time is 0.5 to 8 hours and more preferably 1 to 3 hours, and the cooling speed is preferably 50 to 500° C./hour and more preferably 200 to 300° C./hour. Also the firing atmosphere is preferably a reduced atmosphere, and as for the atmosphere gas, for example wet mixed gas of $N_2$ and $H_2$ is preferably used.

When fired under reduced atmosphere, the sintered body (the capacitor element body) after firing is preferably annealed. The annealing is a treatment to reoxidize the dielectric layer, and thereby the IR lifetime can be prolonged prominently thus the reliability improves.

The oxygen partial pressure of the annealing atmosphere is preferably $1 \times 10^{-4}$ Pa or higher, and particularly $1 \times 10^{-4}$ to 10 Pa. If the partial pressure is below said range, then reoxidization of the dielectric layer becomes difficult. If it exceeds said range, then the internal electrode tends to be oxidized.

The holding temperature at the annealing is preferably 1200° C. or less, and particularly 500 to 1200° C. If the holding temperature is below said range, then the oxidization of the dielectric layer becomes insufficient which may result in low IR and short IR lifetime. On the other hand if the holding temperature exceeds above temperature, then not only the capacity is reduced due to the oxidation of the internal electrode layer, but also the internal electrode layer reacts with the dielectric base which easily cause to deteriorate the capacity-temperature characteristics, to lower IR, and to shorten the IR lifetime. Note that, the annealing may be constituted from the temperature rising step and the cooling step. That is, the temperature holding time may be zero. In this case, the holding temperature is equivalent to the maximum temperature.

As for the conditions other than these, the temperature holding time is preferably 0 to 20 hours and more preferably 2 to 10 hours. The cooling speed is preferably 50 to 500° C./hour, and more preferably 100 to 300° C./hour. Also, as for the atmosphere gas of the annealing is, for example, wet $N_2$ gas is preferably used.

In above said binder removal treatment and the firing and the annealing, $N_2$ gas and mixed gas or so can be wetted for example by using a wetter or so. In this case, the water temperature is preferably 5 to 75° C.

The binder removal treatment, the firing and the annealing may be performed consecutively or independently. When performing these consecutively, the atmosphere is changed without cooling after the binder removal treatment, and then it is fired by raising the temperature to the holding temperature of the firing. Then it is cooled, and the annealing is preferably performed by changing the atmosphere when the temperature reaches to the holding temperature of the annealing. On the other hand, in case of performing these independently, when firing, after raising the temperature to the holding temperature at the binder removal treatment under the atmosphere of $N_2$ gas or wet $N_2$ gas, the atmosphere is changed and the temperature preferably continues to rise. Then, the holding temperature is cooled to that of at the annealing, and the temperature preferably continues to cool down again under $N_2$ gas or wet $N_2$ gas atmosphere. Also, when annealing, the atmosphere may be changed after the temperature is raised to the holding temperature under $N_2$ gas atmosphere, or the whole process of annealing may be performed under wet $N_2$ gas atmosphere.

The fired capacitor body obtained as described in the above is subject to the end surface polishing by for example barrel-polishing or sand blast, and the external electrode is formed to obtain the ceramic capacitor. Also, a covering layer (pad layer) may be formed on the surface of the external electrode by plating or so if needed. The obtained ceramic capacitor thereby is mounted on the print board circuit by soldering or so and used in variety of electronic devices.

Hereinbefore, the embodiments of the present invention have been described, however the present invention is not limited to the above mentioned embodiments and can be variously modified within the scope of the present invention.

For example, the dielectric ceramic composition obtained by the method of the present invention is not only used in the multilayer ceramic capacitor, but it may be used in other electronic component in which the dielectric layer is formed.

EXAMPLES

Next, the present invention will be explained in further detail by using the examples which further specifies the preferred embodiment of the present invention. Note that, the present invention is not limited to these examples.

Making the Disk Form Sample

First, as for the starting material to produce the dielectric oxide, $SrCO_3$, $CaCO_3$, $TiO_2$, $ZrO_2$ and $HfO_2$ having average particle diameter of 0.4 μm were prepared.

Next, the prepared each starting material was scaled in weight ratio so that the final composition becomes $[(Ca_{0.7}Sr_{0.3})O][(Ti_{0.03}Zr_{0.92}Hf_{0.05})O_2]$, and were mixed to prepare a pre-calcined mixture.

Next, the obtained pre-calcined mixture was calcined to obtain the dielectric oxide shown in the above composition. The condition of the calcine was as follows. The temperature rising speed: 200° C./hour, the holding temperature: 1200° C., the temperature holding time: 2 hours, the atmosphere: air. Next, the obtained dielectric oxide was pulverized by alumina roll.

Next, as for the sintering aid, the mixture of MnO, $Al_2O_3$ and $SiO_2$ was prepared with the composition shown in Table 1, and was added in the ratio shown in Table 1 with respect to 100 parts by weight of above dielectric oxide. Furthermore, polyvinyl alcohol as a binder was added so that it becomes 0.6 wt %, and the binder and the dielectric oxide were mixed to form a granular form.

Note that, in the samples 16 to 20, the mixture of MnO, $Al_2O_3$ and $SiO_2$ was prepared in the composition shown in Table 1, and the mixture was heat treated at the temperature rising speed of 200° C./hour, the holding temperature of 1100° C. and the temperature holding time of 4 hours, and in air. After making into a glass, the above said dielectric oxide was mixed.

Also, in the samples 21 to 23, 3 parts by weight of the glass component $((Ba_sCa_{1-s})_tSiO_2)$ (hereinafter referred as "BCG" as well) which composition is shown in Table 2 was added with respect to 100 parts by weight of the above stated dielectric oxide. The predetermined composition of $BaCO_3$, $CaCO_3$, and $SiO_2$ were wet-mixed for 16 hours using ball mill, and fired at 1000 to 1300° C. in air after drying, followed by wet pulverizing for 100 hours by ball mill to prepare BCG.

Furthermore, in the samples 24 to 27, the composition shown in Table 3 was used as the dielectric oxide. The dielectric oxide used in the samples 24 to 27 were made as same as the above, except for changing the composition ratio of the starting material.

Moreover, in the samples 28 to 30, the dielectric oxide of the composition shown in Table 3 was used and sodium oxide was further added. The composition amount of sodium oxide was 0.10 parts by weight (sample 28), 0.25 parts by weight (sample 29), 0.50 parts by weight (sample 30) in terms of $Na_2O$, with respect to 100 parts by weight of the dielectric oxide.

0.3 g of obtained granular dielectric material was scaled, and pressed at 1.3 tons/cm² of pressure to obtain disk form molding having 12 mm of diameter and 0.7 mm of thickness.

Next, the binder removal treatment, the firing and the annealing were performed to the obtained disk form molding to obtain the disk form fired body having a diameter of about 10 mm, a thickness of about 0.5 mm. The binder removal treatment was performed under the temperature rising speed of 200° C./hour, the holding temperature of 400° C., the holding time of 2 hours and air atmosphere. Also, the firing was performed under the temperature rising speed of 200° C./hour, the holding temperature: refer to Table 1, the holding time of 2 hours, the cooling rate of 200° C./hour and wet mixed gas of $N_2$ and $H_2$ atmosphere (the oxygen partial pressure of $10^{-12}$ Pa). The annealing was performed at the holding temperature 1100° C., the temperature holding time of 2 hours, the cooling rate of 200° C./hour and wet $N_2$ gas atmosphere (the oxygen partial pressure of $10^{-2}$ Pa). Note that, a wetter was used for wetting the atmosphere gas of the firing and the annealing.

Next, In—Ga alloy was coated on the both sides of the obtained disk form fired body, and Φ (diameter) 6 mm of electrode was formed to make disk form sample.

Making the Capacitor Sample

Also, the dielectric layer paste was obtained by mixing 100 parts by weight of the above obtained dielectric oxide, the sintering aid having the composition shown in Table 1, 4.8 parts by weight of acrylic resin, 40 parts by weight of methylene chloride, 20 parts by weight of ethyl acetate, 6 parts by weight of mineral spirit, and 4 parts by weight of acetone in the ball mill to make a paste. Note that, the samples 16 to 30 were subject to the same change as stated in above.

The internal electrode layer paste was obtained by kneading 100 parts by weight of Ni particle having average diameter of 0.1 to 0.8 μm, 40 parts by weight of organic vehicle (8 parts by weight of ethyl cellulose dissolved in 92 parts by weight of butyl carbitol), and 10 parts by weight of butyl carbitol using triple rolls to make a paste.

The external electrode paste was obtained by kneading 100 parts by weight of Cu particle having average diameter of 0.5 μm, 35 parts by weight of organic vehicle (8 parts by weight of ethyl cellulose resin dissolved in 92 parts by weight of butyl carbitol), and 7 parts by weight of butyl carbitol to make a paste.

Next, a green sheet having thickness of 7 μm was formed on the PET film using the above dielectric layer paste, then after printing the internal electrode layer paste thereon, the green sheet was removed from the PET film.

Next, these green sheets and the protective green sheet (which is not printed with the internal electrode layer paste) were staked and the green chip was obtained by pressure binding. The numbers of staked sheets comprising the internal electrodes were 101 layers.

Then the green chip was cut into a predetermined size, then the binder removal process, the firing, and the annealing (all of them having the same condition as that of making the above disk form sample) were performed to obtain multilayer ceramic fired body.

Next, after polishing the end surfaces of the multilayer ceramic body by sand blast, the external electrode paste was transferred to the end surfaces and was fired at 800° C. for 10 minutes under wet $N_2+H_2$ gas atmosphere to form the external electrode, and the multilayer ceramic capacitor was obtained. Thus obtained each sample had a size of 3.2 mm×1.6 mm×0.6 mm. The numbers of the dielectric layers stacked between the internal electrode layers were 100. The thickness of dielectric layer was 4.9 μm, and the thickness of the internal electrode layer was 0.2 μm.

Evaluation of the Disk Form Sample and the Capacitor Sample

Using the obtained disk form sample and the capacitor sample, the ceramic characteristics (the sintered densification, and the crystal grain diameter), the electric characteristics (the insulated resistance IR, and the specific permittivity $\in$) and the occurrence rate of the cracks were evaluated by the following methods.

(The Sintered Densification)

The sintered densification was calculated from the dimension and the mass of the disk form sample. The sintered densification was considered good when it was preferably 4.3 g/cm$^3$ or higher. Note that, the value of the sintered densification was obtained from the average of measured values using the disk form sample numbers of n=10.

(Average Grain Diameter)

The crystal diameter of the dielectric particle (grain) constituting the dielectric layer was calculated by coding method using SEM photo of the capacitor sample. In the present example, the particle diameter was calculated assuming that the form of the dielectric particle is a sphere for convenience. Specifically, first by using the SEM photo showing the fine structure of the dielectric layer, an arbitrary line was drawn on to this SEM photo and the number of the points (intercepting points) where said line and the grain boundary existing between the adjacent dielectric particles intercepts was obtained. Next, from the obtained number of intercepting points, the number of PL was calculated which is the intercepting points with the grain boundaries within the unit length. Then, the length of the code L3 was calculated using the obtained value of PL. The length of the code L3 was obtained by 1/PL. Next, the average crystal diameter of the dielectric particle was calculated by multiplying by 1.5 to the obtained L3. Note that, the field vision of the SEM photo used was 23 μm×30 μm. 5 to 6 photos were used per each sample to calculate each particle diameter, and the average value thereof was set to average crystal particle diameter.

(Insulation Resistance IR)

The insulation resistance IR was evaluated as follows. By using an insulating resistance meter (Made by Advantest Corporation, R8340A), the insulating resistance IR (unit: Ω) after applying DC 50V to the capacitor sample for 60 seconds at 25° C. was measured. The insulating resistance IR was considered good if it was $1\times10^{11}$Ω or higher. Note that, the value of the insulating resistance IR was determined from the average value measured from the capacitor sample number of n=10.

(Specific Permittivity $\in$)

The capacitance C was measured under the frequency of 120 Hz, the input signal level (measuring voltage) of 0.5 Vrms/μm, by using the digital LCR meter (made by Yokogawa Electric Corporation, YHP4274A) to the capacitor sample at base temperature of 20° C. Then, the specific permittivity (no unit) was calculated from obtained capacitance, the thickness of the dielectric of the multilayer ceramic capacitor and the overlapping area of the internal electrodes. The higher the specific permittivity is, the more preferable it is.

(The Ratio of Occurrence of the Crack)

The ratios of occurrences of the cracks were evaluated as follows.

All of the capacitor samples were subject to the exterior examination. Note that, the measured numbers were 100.

TABLE 1

The composition of the sintering aid, the composition amount and the firing temperature

| | | Composition of the sintering aid (whole amount 100 wt %) | | | The composition amount (parts by weight) of the sintering aid with respect to 100 parts of | Firing |
|---|---|---|---|---|---|---|
| | | MnO | Al$_2$O | SiO$_2$ | dielectric oxides | temp. (° C.) |
| sample | 1 | 20 | 10 | 70 | 3 | 1330 |
| | 2 | 30 | 22 | 48 | 3 | 1230 |
| | 3 | 30 | 40 | 30 | 3 | 1260 |
| | 4 | 39 | 1 | 60 | 3 | 1300 |
| | 5 | 40 | 2 | 58 | 3 | 1210 |
| | 6 | 45 | 20 | 35 | 3 | 1220 |
| | 7 | 53 | 10 | 37 | 3 | 1210 |
| | 8 | 55 | 2 | 43 | 3 | 1190 |
| | 9 | 55 | 10 | 35 | 3 | 1210 |
| | 10 | 60 | 5 | 35 | 3 | 1190 |
| | 11 | 62 | 3 | 35 | 3 | 1200 |
| | 12 | 65 | 5 | 30 | 3 | 1200 |
| | 13 | 70 | 5 | 25 | 3 | 1220 |
| | 14 | 70 | 20 | 10 | 3 | 1290 |
| | 15 | 80 | 5 | 15 | 3 | 1350 |
| | 16 | 55 | 2 | 43 | 3 | 1255 |
| | 17 | 55 | 10 | 35 | 3 | 1270 |
| | 18 | 60 | 5 | 35 | 3 | 1260 |
| | 19 | 62 | 3 | 35 | 3 | 1255 |
| | 20 | 65 | 5 | 30 | 3 | 1280 |
| | 21 | 60 | 5 | 35 | 3 | 1330 |
| | 22 | 60 | 5 | 35 | 3 | 1300 |
| | 23 | 60 | 5 | 35 | 3 | 1310 |
| | 24 | 60 | 5 | 35 | 3 | 1220 |
| | 25 | 60 | 5 | 35 | 3 | 1190 |
| | 26 | 60 | 5 | 35 | 3 | 1180 |
| | 27 | 60 | 5 | 35 | 3 | 1250 |
| | 28 | 60 | 5 | 35 | 3 | 1100 |
| | 29 | 60 | 5 | 35 | 3 | 1120 |
| | 30 | 60 | 5 | 35 | 3 | 1150 |

Note 1:
In the samples 16 to 20, the sintering aid was added after making into a glass.

Note 2:
In the samples 21 to 23, 3 parts by weight of BCG shown in Table 2 were added.

Note 3:
In the samples 24 to 30, the dielectric oxide having a composition shown in Table 3 was used.

Note 4:
0.10 parts by weight (sample 28), 0.25 parts by weight (sample 29), 0.50 parts by weight (sample 30) of Na$_2$O were further added.

TABLE 2

The mixed amount and the composition of BCG used in samples 21 to 23

| Sample | $(Ba_sCa_{1-s})SiO_2$ | | | The composition amount (parts by weight) of BCG with respect to 100 parts of dielectric oxide |
|---|---|---|---|---|
| | s | 1 − s | t | |
| 21 | 0.5 | 0.5 | 1 | 3 |
| 22 | 0.5 | 0.5 | 0.3 | 3 |
| 23 | 0.5 | 0.5 | 0.5 | 3 |

TABLE 3

The composition of the dielectric oxide used in the samples 24 to 30

| | $[(Ca_xSr_{1-x})O]_m[(Ti_yZr_{1-y-z}Hf_z)O_2]$ | | | | | |
|---|---|---|---|---|---|---|
| | x | 1 − x | y | 1 − y − z | z | m |
| Sample 24 | 0.7 | 0.3 | 0.03 | 0.92 | 0.05 | 0.99 |
| 25 | 0.7 | 0.3 | 0.03 | 0.92 | 0.05 | 1 |
| 26 | 0.7 | 0.3 | 0.03 | 0.92 | 0.05 | 1.01 |
| 27 | 0.7 | 0.3 | 0.03 | 0.92 | 0.05 | 1.02 |
| 28-30 | 0.7 | 0.3 | 0.03 | 0.92 | 0.05 | 1.01 |

TABLE 4

Results of the Evaluation

| | | Specific permittivity $\epsilon$ | Insulating resistance IR $\Omega$ | Sintered densification $\rho s$ g/cm$^3$ | Crystal diameter μm | Occurrence of crack (n = 100) % |
|---|---|---|---|---|---|---|
| sample | 1 | 33 | $8.0 \times 10^{11}$ | 4.4 | 1.8 | 90 |
| | 2 | 36 | $2.0 \times 10^{13}$ | 4.6 | 2.2 | 4 |
| | 3 | 35 | $5.0 \times 10^{12}$ | 4.5 | 2.5 | 5 |
| | 4 | 34 | $7.0 \times 10^{12}$ | 4.5 | 2 | 85 |
| | 5 | 36 | $3.5 \times 10^{13}$ | 4.6 | 2 | 1 |
| | 6 | 35 | $2.0 \times 10^{13}$ | 4.5 | 2.8 | 3 |
| | 7 | 36 | $4.5 \times 10^{13}$ | 4.6 | 2.6 | 2 |
| | 8 | 37 | $5.0 \times 10^{13}$ | 4.7 | 3 | 0 |
| | 9 | 37 | $5.0 \times 10^{13}$ | 4.6 | 2.8 | 0 |
| | 10 | 39 | $8.0 \times 10^{13}$ | 4.8 | 2 | 0 |
| | 11 | 38 | $6.0 \times 10^{13}$ | 4.8 | 3 | 0 |
| | 12 | 37 | $6.0 \times 10^{13}$ | 4.7 | 2.6 | 0 |
| | 13 | 36 | $1.0 \times 10^{13}$ | 4.5 | 3.2 | 3 |
| | 14 | 33 | $5.0 \times 10^{11}$ | 4.4 | 1.5 | 70 |
| | 15 | 30 | $2.0 \times 10^{10}$ | 4.2 | 1.2 | 100 |
| | 16 | 35 | $1.0 \times 10^{13}$ | 4.6 | 2.2 | 4 |
| | 17 | 36 | $5.0 \times 10^{12}$ | 4.5 | 2.6 | 15 |
| | 18 | 36 | $3.5 \times 10^{12}$ | 4.5 | 2.5 | 10 |
| | 19 | 34 | $2.0 \times 10^{13}$ | 4.6 | 2.7 | 5 |
| | 20 | 32 | $1.5 \times 10^{13}$ | 4.6 | 2.9 | 25 |
| | 21 | 33 | $1.0 \times 10^{11}$ | 4.4 | 3 | 70 |
| | 22 | 34 | $5.0 \times 10^{12}$ | 4.5 | 2 | 85 |
| | 23 | 34 | $3.5 \times 10^{12}$ | 4.5 | 2.5 | 50 |
| | 24 | 38 | $7.0 \times 10^{13}$ | 4.7 | 2.5 | 0 |
| | 25 | 39 | $8.0 \times 10^{13}$ | 4.8 | 2 | 0 |
| | 26 | 39 | $8.0 \times 10^{13}$ | 4.8 | 0.8 | 0 |
| | 27 | 39 | $5.0 \times 10^{12}$ | 4.5 | 1 | 0 |
| | 28 | 38 | $8.0 \times 10^{13}$ | 4.7 | 0.75 | 0 |
| | 29 | 38 | $1.0 \times 10^{13}$ | 4.7 | 0.7 | 0 |
| | 30 | 37 | $2.0 \times 10^{11}$ | 4.6 | 0.7 | 0 |

Followings can be understood according to Table 1. As shown in the samples 1 to 5 or the samples 13 to 15, if the composition of the sintering aid is out of the range of the present invention, the firing temperature to achieve the desired electric characteristic increases. Also, the occurrence of the crack increases, thus the reliability declines. Furthermore, as shown in the samples 16 to 23, the same results can be seen even in the cases when the sintering aid which was made into glass was used, or other glass component was added.

On the other hand, by using the sintering aid having the composition defined in the present invention, the capacitor having high reliability (samples 6 to 12, and 24 to 27) can be obtained without compensating the dielectric characteristics even when the firing temperature is relatively low. Also, by adding sodium oxide, the firing temperature can be further lowered (samples 28 to 30). Thus, the method of production of the present invention is particularly applied in the production of the dielectric layer forming the capacitor satisfying the C0G characteristics defined in the JIS standard CH.

The invention claimed is:

1. A method of production of a dielectric ceramic composition, the method comprising:
preparing a dielectric oxide having a composition formula of:

$$[(Ca_xSr_{1-x})O]_m[(Ti_yZr_{1-y-z}Hf_z)O_2]$$

where x, y, z, and m in the formula are:
   $0.5 \leqq x \leqq 1.0$,
   $0.01 \leqq y \leqq 0.10$,
   $0 < z \leqq 0.20$, and
   $0.90 \leqq m \leqq 1.04$,
   mixing, with respect to 100 parts by weight of the dielectric ceramic composition, 1 to 10 parts by weight of a sintering aid and 0.1 to 1.5 parts by weight of sodium oxide, sodium carbonate, or a mixture thereof in terms of $Na_2O$, and firing an obtained mixture;

wherein said sintering aid comprises, with respect to 100 wt % of said sintering aid:
   30 to 69 wt % of manganese oxide, manganese carbonate, or a mixture thereof in terms of MnO,
   1 to 20 wt % of aluminum oxide in terms of $Al_2O_3$, and
   30 to 50 wt % of silicon oxide in terms of $SiO_2$.

* * * * *